United States Patent
Grandpierre et al.

(10) Patent No.: US 6,816,684 B2
(45) Date of Patent: Nov. 9, 2004

(54) METHOD OF GENERATING A CLOCK SIGNAL OF EXACT PHASE FROM AN OPTICAL INPUT SIGNAL AND OPTICAL RECEIVER THEREFOR

(75) Inventors: Georges Grandpierre, Arpajon (FR); Francois Lafranca, Chelles (FR)

(73) Assignee: Alcatel, Paris (FR)

( * ) Notice: Subject to any disclaimer, the term of this patent is extended or adjusted under 35 U.S.C. 154(b) by 273 days.

(21) Appl. No.: 09/923,370

(22) Filed: Aug. 8, 2001

(65) Prior Publication Data

US 2002/0018272 A1 Feb. 14, 2002

(30) Foreign Application Priority Data

Aug. 11, 2000 (EP) .................................. 00440228

(51) Int. Cl.[7] .............................................. H04B 10/06
(52) U.S. Cl. ..................... 398/202; 398/154; 398/155; 713/401
(58) Field of Search ................. 398/154, 155, 398/202; 713/400, 401

(56) References Cited

U.S. PATENT DOCUMENTS

| 4,847,870 A | 7/1989 | Butcher ................. 375/333 |
| 5,854,704 A | 12/1998 | Grandpierre ............. 398/202 |
| 5,923,455 A * | 7/1999 | Rokugawa ............... 398/202 |

FOREIGN PATENT DOCUMENTS

| EP | 9 817 408 A1 | 1/1998 |
| EP | 0 902 559 A2 | 3/1999 |

* cited by examiner

*Primary Examiner*—Jason Chan
*Assistant Examiner*—Christina Y Leung
(74) *Attorney, Agent, or Firm*—Sughrue Mion, PLLC

(57) ABSTRACT

The present invention relates to a method of generating a clock signal of exact phase from an optical input signal that is divided up optically into two channels, one for data extraction to generate an electrical data signal and one for clock extraction to generate an electrical first clock signal, so that the phase position of the first clock signal is corrected by comparison with the phase position of the data signal so that the phase position of the resulting clock signal formed after this correction is similar to the phase position of the data signal, and also a digital optical receiver therefor.

4 Claims, 1 Drawing Sheet

METHOD OF GENERATING A CLOCK SIGNAL OF EXACT PHASE FROM AN OPTICAL INPUT SIGNAL AND OPTICAL RECEIVER THEREFOR

BACKGROUND OF THE INVENTION

The invention is based on a priority application EP 00 440 228.5 which is hereby incorporated by reference.

The invention relates to a method of generating a clock signal (clk) from an optical input signal (1) that is divided up optically into two channels, one for data extraction to generate an electrical data signal (11) and one for clock extraction to generate an electrical first clock signal (21) and also a digital optical receiver having an optical channel for data extraction and an optical channel for clock extraction, both channels each comprising means for converting the optical received signal into an electrical signal.

During the transmission of optical digital signals, various dispersion effects occur that are caused by the optical waveguides of the optical transmission system. In addition, the useful power decreases with increasing transmission distance with respect to the noise power because of the attenuation properties of the optical waveguide. At high bit rate (gigabit range), in particular, these effects result in falsification of the transmitted data signals. Optical receivers that are used in such a transmission system are confronted with the task of evaluating even falsified signals and, in this connection, to permit only low bit error rates. For this purpose, the received optical signal is converted into an electrical signal, sampled with the signal clock and then conveyed to a decision circuit in which a digital decision is made by a comparison with a threshold. A substantial problem in this connection is the recovery of the signal clock from the transmitted signal. Existing receivers frequently solve the problem in that the received optical signal is first converted into an electrical signal by means of a photodiode and is fed to the said decision circuit. The said electrical signal is cut off by means of a so-called splitter and fed to a clock recovery circuit. The clock or sampling signal extracted by the clock recovery circuit is fed to the said decision device, where the data signal is then sampled. It has been found, however, that, in particular at bit rates above 5 gigabit, phase and amplitude interferences in the electrical data signals occur because of increasing electromagnetic radiation from the highly integrated circuits of the receiver. These errors result in an increased bit error rate.

EP 0 817 408 A1 discloses a receiver for an optical digital transmission system in which the abovementioned interferences are reduced, inter alia, as a result of the fact that the received optical signal is divided up by means of an optical splitter into two optical signals for a channel for data extraction and a channel for other functions, in particular clock recovery, respectively. The conversion into electrical signals by means of a photodiode then takes place separately in each channel. A far lower mutual electromagnetic interference of the said channels is thereby achieved. A remaining problem is, however, presented by different signal delay times in the two channels that are due, for example, to temperature differences or to ageing, in particular, of the photodiodes. As a result, a phase shift of the clock signal occurs with respect to the data signal. This then results in incorrect digital identifications in the decision circuit and consequently also in a higher bit error rate.

SUMMARY OF THE INVENTION

The object of the invention is to modify an optical receiver of the type mentioned in the last section so that an adaptive phase correction of the clock signal is achieved with which the data signal can then be correctly sampled.

According to the invention, this object is achieved by a method of generating a clock signal from an optical input signal that is divided up optically into two channels, one for data extraction to generate an electrical data signal and one for clock extraction to generate an electrical first clock signal and also a receiver having an optical channel for data extraction and an optical channel for clock extraction, both channels each comprising means for converting the optical received signal into an electrical signal.

Further advantageous embodiments of the invention are to be found in the dependent claims and the description.

BRIEF DESCRIPTION OF THE DRAWINGS

The invention is explained further below by reference to the drawings, in which:

FIG. 1 shows an optical input signal 1 that first passes through a controllable optical amplifier AGC and a band-pass filter BPF before it is passed as an amplified and filtered signal 1' to the input of an optical coupler OC. The optical splitter has two outputs, each of the outputs being connected to one input in each case of a photodiode PID1 and PID2. The output of the photodiode PD1 is connected via an (electrical) amplifier AMP and a low-pass filter LPF to the input of an (electrical) splitter SP1 having two outputs, one output being connected to an input of a decision circuit DC. At the output of the decision circuit there is an output signal 2 of the optical receiver. The second output of the splitter SP1 carries a data signal 11 that is fed to one of the two input signals of a phase difference circuit PD. The output of the photodiode PID2 is connected to the input of an (electrical) splitter SP3 having two outputs, the one output being connected via a gain controller LC to the control input of the optical amplifier AGC and the other output being connected to the input of a clock recovery circuit CR. The output of the clock recovery circuit CR is connected to the input of a further (electrical) splitter SP2 having two outputs. One of these outputs is connected to one of two inputs of a phase correction circuit PHC, whose output carrying the clock signal clk is in turn connected to the second input of the decision circuit DC. The second output of the splitter SP2 carrying the first clock signal 21 is connected to the second input of the phase difference circuit PD. The output of the phase difference circuit PD carrying the delay signal ds is connected to the second input of the phase correction circuit PHC.

The optical splitting of the amplified and filtered signal 1' over a data extraction channel and a clock recovery channel, respectively, is disclosed in the abovementioned EP 0 817 408 A1. The optical input signal 1 is a binary signal comprising a sequence of code elements that assume only the values "0" or "1". This sequence is transmitted at the rate r=1/T, T being the time duration, referred to below also as clock time, for the transmission of a code element. The rate r is also referred to as symbol frequency. A light pulse is transmitted for each code element having the value "1". In this connection, the light pulses can have various shapes. Frequently, the pulse has an approximately rectangular shape, with a power that is continuous during the entire time duration T. Since such a signal does not return to zero for the successive transmission of "1", it is also referred to as NRZ (no return to zero) signal. A further, frequent pulse shape is the so-called soliton pulse whose duration is markedly shorter than the clock time T. The pulse shape is unimportant for the invention; for example, NR signals, so-called RZ signals (return to zero) and soliton signals can be processed.

Compared to the prior art, the receiver disclosed differs in that the first clock signal 21 is fed not directly to the decision circuit DC, but via the phase correction circuit PHC. For this purpose, the data signal 11 is tapped off via the splitter SP1 as close as possible to the input of the decision circuit and the first clock signal 21 is tapped off via the splitter SP2 as close as possible to the input of the phase correction circuit PHC, the phase difference of the two signals is determined in the phase difference circuit PD and a corresponding delay signal ds is fed to the phase correction circuit PHC. The phase correction circuit PHC delays the clock signal clk to such an extent that it is in phase with the data signal to be sampled at the input of the decision circuit.

Figure 1:
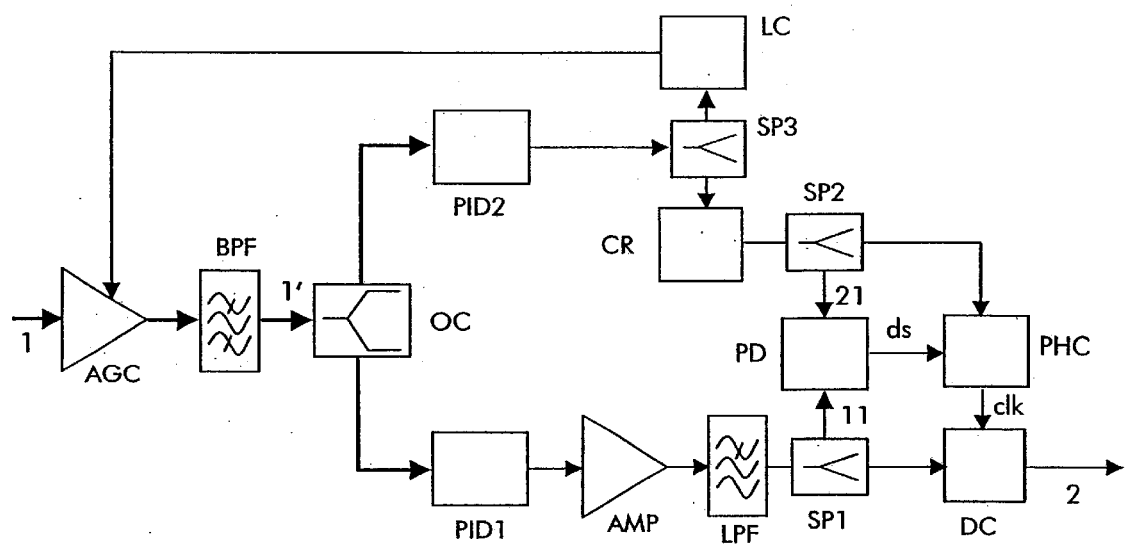
FIG. 1 shows a block circuit diagram of an optical receiver according to the invention and FIG. 2 shows a block circuit diagram of a basic circuit for determining the phase difference.
Figure 2:
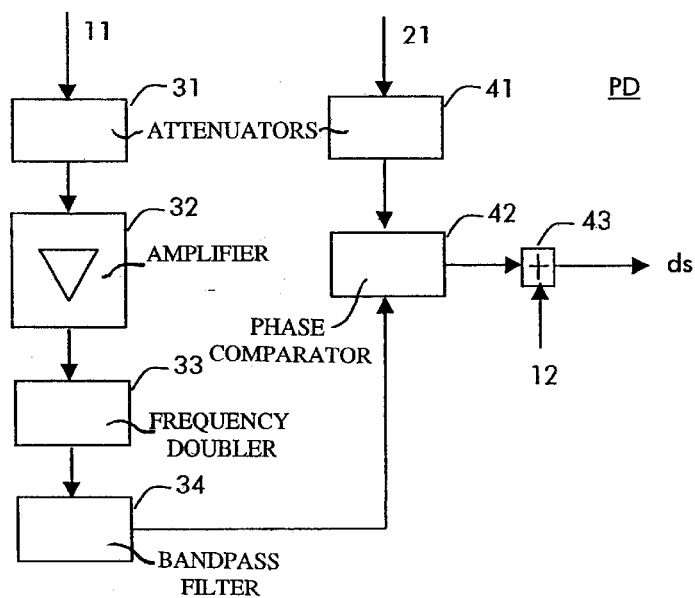

FIG. 2 shows an exemplary block circuit diagram of the phase difference circuit PD from FIG. 1. The data signal 11 is fed via a first attenuation element 31, a narrow-band amplifier 32, a frequency doubler 33 and a band-pass filter 34 to one of the two inputs of a phase comparator 42. The first clock signal 21 is fed via a second attenuation element 41 to the second input of the phase comparator 42, whose output is fed to an adder 43. In the adder 43, an adjustable offset value 12 is added and the sum of the two signals is outputted as delay signal ds.

The attenuation elements 31 and 41 reduce the signal power of the signals 11 and 21, respectively. This reduction in the signal power serves to match the signal power to the phase comparator 42. The frequency spectrum of the data signal 11 does not contain any spectral lines or (approximately) discrete spectrum components at the points f=1/T and f=−1/T (clock frequency=1/T), but it does at the points of the respective half frequencies f=½T and f=−½T. No direct recovery of the clock signal from the data signal 11 is therefore possible as a result of simple filtering. For this purpose, the signal 11, after attenuation by the first attenuation element 31, is first fed to the narrow-band amplifier 32, which performs a symmetrical narrow-band amplification around the frequency values f=½T and f=−½T. As a result of the subsequent frequency doubling in the frequency doubler 33, a signal is produced that has spectral lines at the points 1/T and −1/T. The frequency can be doubled, for example, by multiplying the signal. Narrow-band filtering around the frequencies 1/T and −1/T now produces a sinusoidal signal having the angular frequency 2*pi/T. The other frequency components, which are not filtered out, result in an undesirable jitter of the angular frequency. The band-pass filter 34 is of as narrow-band and steep-edged design as possible in order substantially to avoid said jitter. The signal obtained is now compared in the phase comparator 42 with the likewise cosinusoidal first clock signal 21. Depending on the phase difference found, the phase comparator 42 emits a first delay signal. To align the entire circuit according to FIG. 1, an adjustable offset value 12 is added to this signal and the sum is fed as delay signal ds to the phase correction circuit PHC shown in FIG. 1. If the phase of the data signal 21 leads the phase of the clock signal 11, i.e. a negative delay value is found, the clock signal is delayed by the time T minus the absolute value of the delay value ds found.

In an alternative embodiment, to avoid the necessary case decision between positive and negative "delays", insertion of a fixed delay element in the data extraction channel ensures that only positive delays in the clock signal have to be undertaken.

In a further alternative embodiment, the data signal 11 is first differentiated after traversing the attenuation element 31 and then rectified by means of a rectifier or squaring circuit. The signal thereby obtained now has discrete spectral components around the frequencies 1/T and −1/T and is fed to the band-pass filter 34. This circuit is suitable, in particular, if the data signal 11 has a substantially ideal NRZ pulse shape, for which the circuit described in the last section is less suitable because of the absence of discrete frequency components.

What is claimed is:

1. A method of generating a clock signal of exact phase from an optical input signal that is divided up optically into two channels, one for data extraction to generate an electrical data signal and one for clack extraction to generate an electrical first clock signal, where the phase position of the first clock signal is corrected by comparison with the phase position of the data signal so that the phase position of the resulting clock signal formed after this correction is similar to the phase position of the data signal, where the resulting clock signal is obtained by a time delay of the first clock signal, and the value of the time delay is determined by the phase comparison of the data signal and the first clock signal, and where, for the comparison, periodic signals of frequency 2*pi/T are generated from the data signal and the clock signal, and wherein T is the time duration of a code element in the clock signal.

2. A digital optical receiver having an optical channel for data extraction and an optical channel for clock extraction, both channels each comprising means for converting the optical received signal into an electrical signal, where the digital optical receiver comprises a phase difference circuit for comparing the phases of the extracted data signal and of the extracted clock signal and a phase correction circuit for adjusting the phase position of the clock signal to obtain the resulting clock signal, and where the phase difference circuit has means for generating periodic signals of frequency 2*pi/T from the data signal and the clock signal and has a phase comparator for determining a delay time for correcting the phase position, and wherein T is the time duration of a code element in the clock signal.

3. A digital optical receiver according to claim 2, further comprising:

a decision circuit, responsive to the data signal and the resulting clock signal, for sampling the data signal.

4. The optical receiver according to claim 2, where the phase correction circuit consists of a tunable delay element for delaying the clock signal by the delay time found.

* * * * *